Nov. 20, 1928.  P. DE MATTIA  1,692,249
COLLAPSIBLE CORE STRUCTURE
Filed April 12, 1927   5 Sheets-Sheet 2

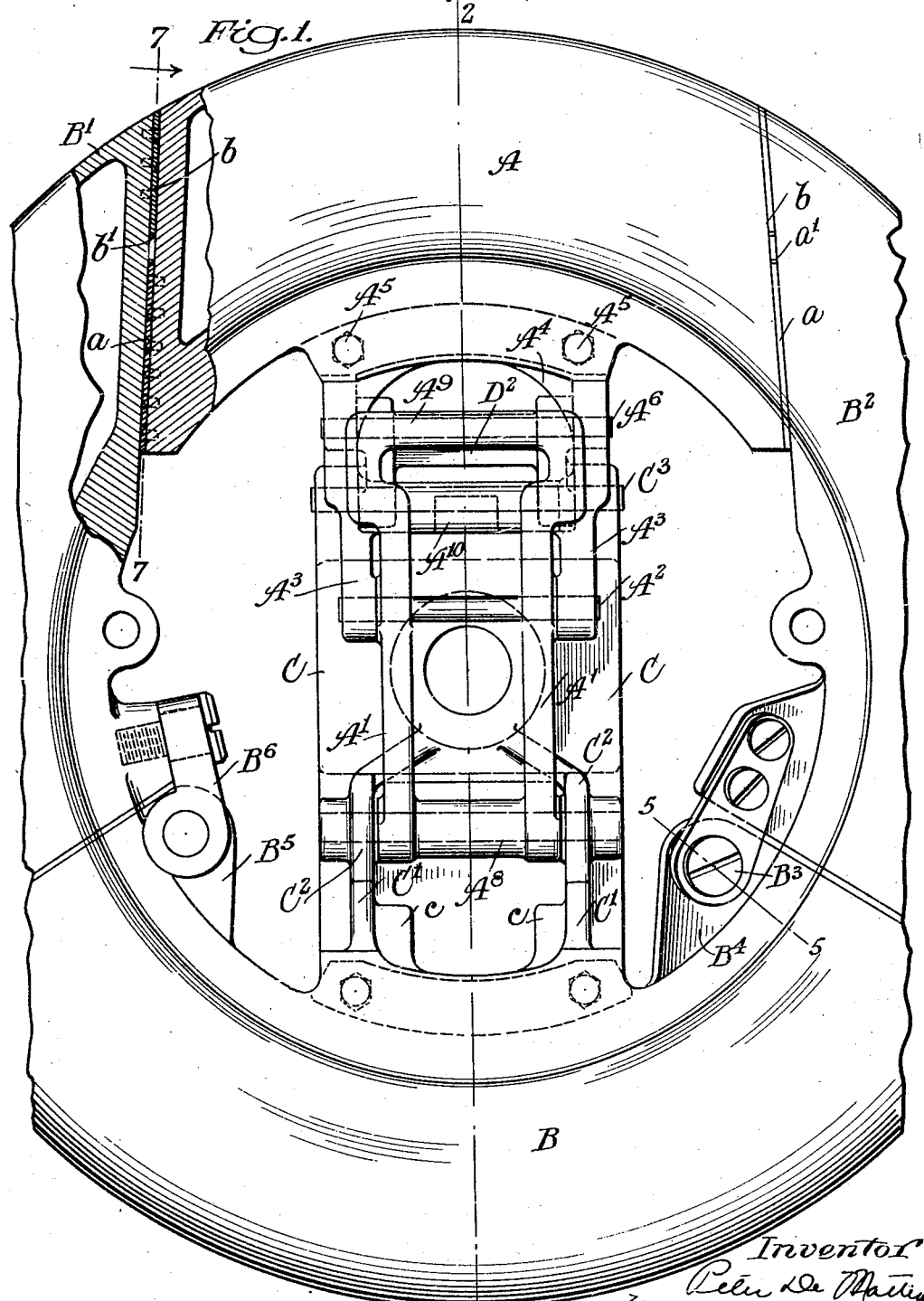

Nov. 20, 1928.   1,692,249
P. DE MATTIA
COLLAPSIBLE CORE STRUCTURE
Filed April 12, 1927   5 Sheets-Sheet 3
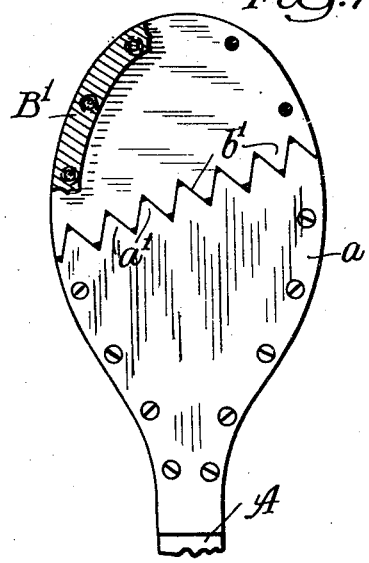
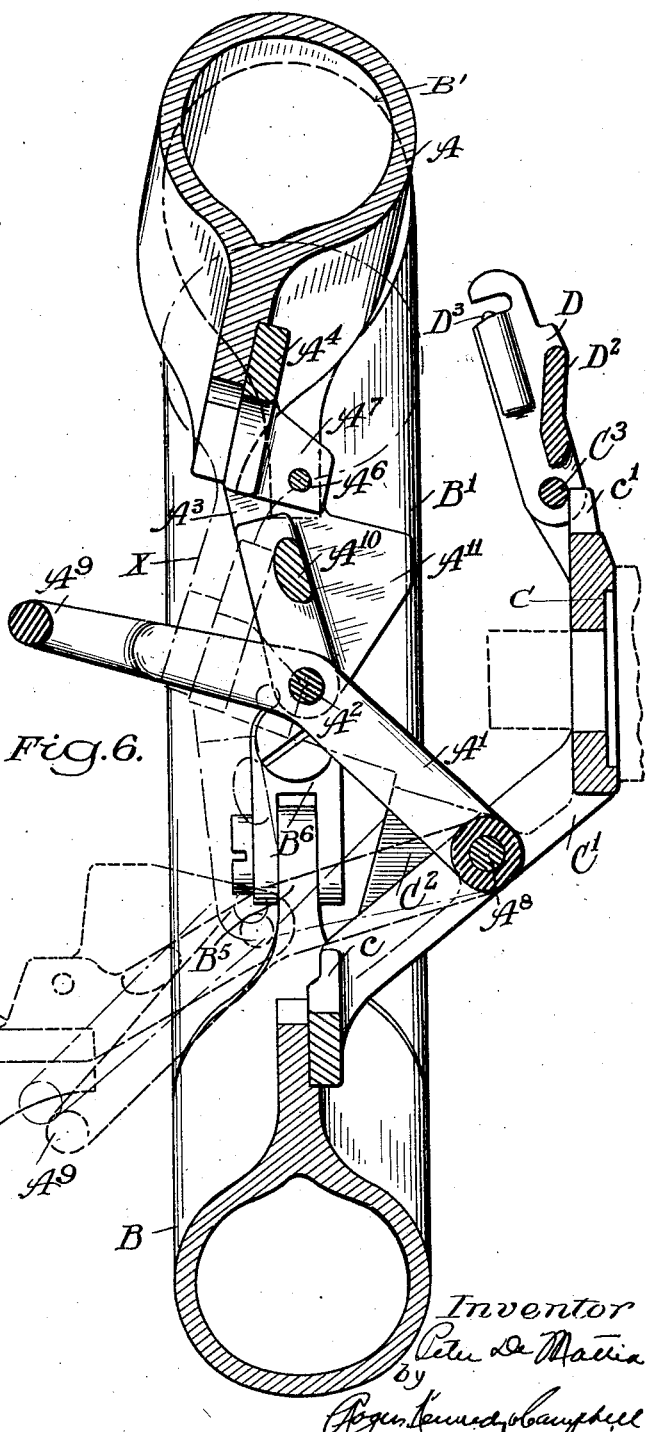

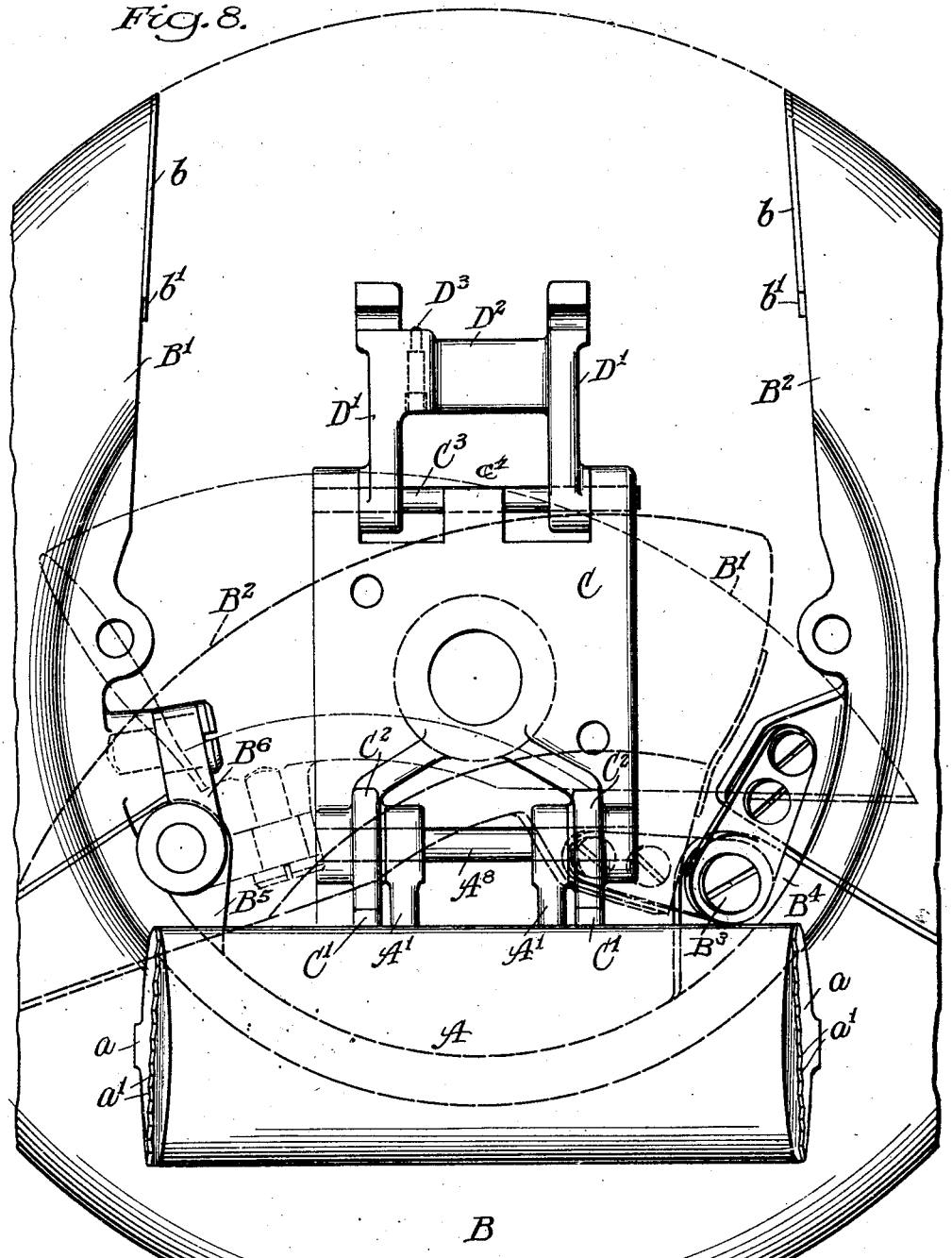

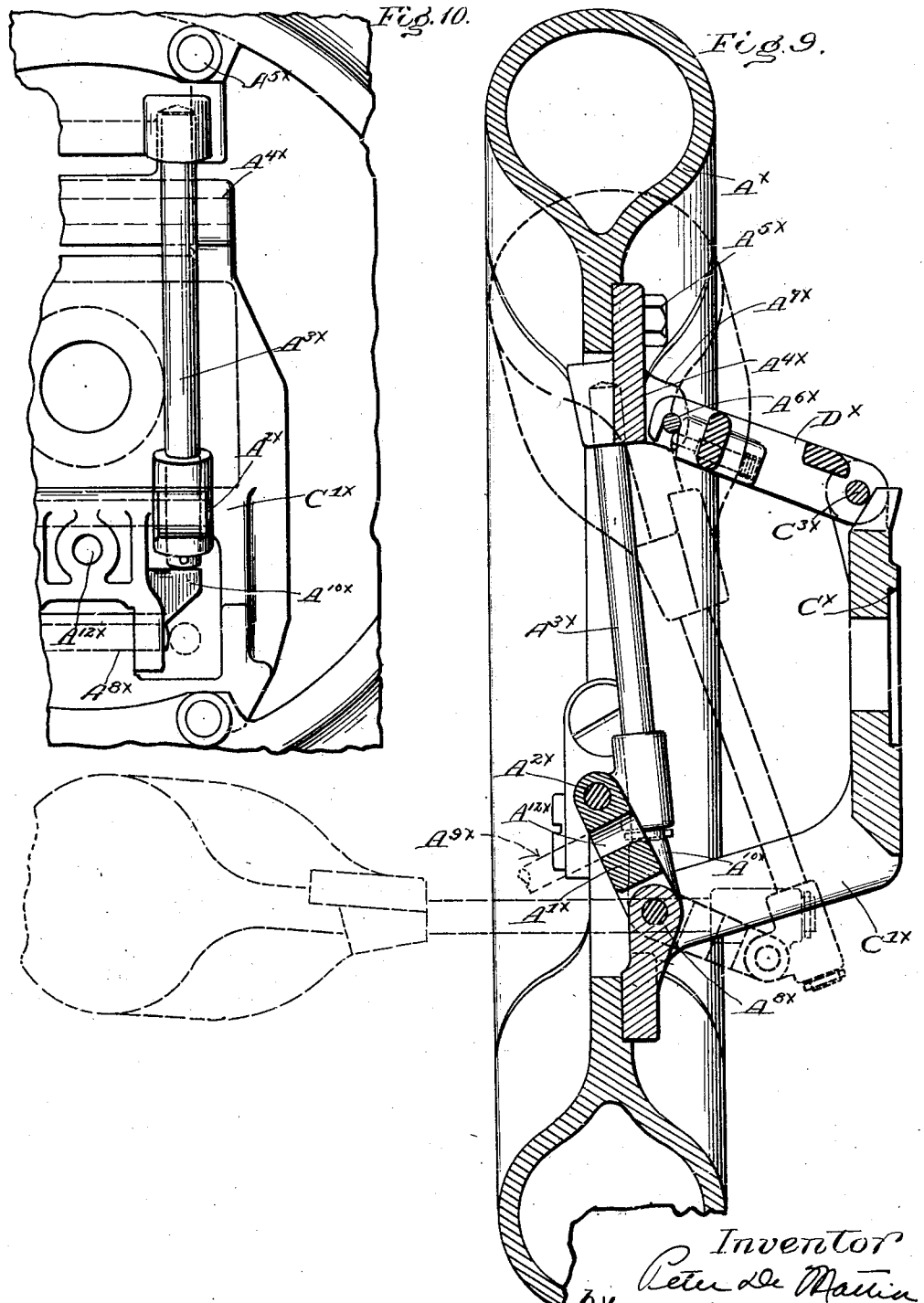

Patented Nov. 20, 1928.

1,692,249

UNITED STATES PATENT OFFICE.

PETER DE MATTIA, OF PASSAIC, NEW JERSEY, ASSIGNOR, BY MESNE ASSIGNMENTS, TO NATIONAL RUBBER MACHINERY COMPANY, OF AKRON, OHIO, A CORPORATION OF OHIO.

COLLAPSIBLE CORE STRUCTURE.

Application filed April 12, 1927. Serial No. 183,036.

This invention relates to collapsible cores, such as are used in the manufacture of tire casings or shoes, and contemplates a simple, compact structure which may be instantly collapsed to permit the tire to be removed therefrom with ease and facility. The essence of the invention lies in mounting the so-called "key" section of the core so that it may be properly withdrawn from the tire and transferred to a position out of the way of the remaining core sections by a compound movement and in a single operation. In the preferred embodiment illustrated, the key section is carried by what in effect is a toggle system which is pivotally connected to the usual rotary support or chuck below its axis of rotation, and is operable to lock the key section in the position of operative continuity or to transport it out of the operative plane of the core.

In the accompanying drawings, the invention has been shown merely in preferred form and by way of example, but obviously many changes or variations may be made therein and in its mode of operation which will still be comprised within its spirit. It should therefore be understood that the invention is not limited to any specific form or embodiment except in so far as such limitations are specified in the claims.

In the drawings:

Fig. 1 is a front elevation, partly in section and partly broken away, of the improved core;

Fig. 6 is a vertical transverse section similar to Fig. 2 showing in full lines the key section as moved slightly from its normal position, and in dotted lines as occupying its extreme forward position;

Fig. 7 is a transverse sectional view taken on the line 7—7 of Fig. 1;

Fig. 8 is a front elevation of the core showing the key section in its extreme forward position and indicating in broken lines the collapsed positions of the respective secondary core sections;

Fig. 9 is a vertical transverse section through a modified form of the improved core; and Fig. 10 is a fragmentary view of the same in front elevation.

The core proper, see Fig. 1, comprises a primary or key section A which is the first section to be removed from the tire in collapsing the core, a fixed secondary bottom section B rigidly secured to the rotatable support C and arranged opposite the key section, and a pair of movable secondary side sections $B^1$ $B^2$ pivotally attached to the inner edge of the fixed core section at opposite ends thereof, the several core sections being arranged end to end in abutting relation to form a complete ring or annulus.

Figure 3:
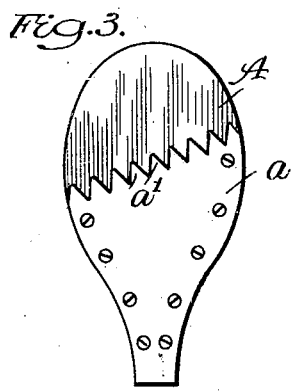
Figs. 3 and 4 are detail face views showing the form of the interlocking plates carried by the key section and the adjoining secondary core sections.
Figure 4:
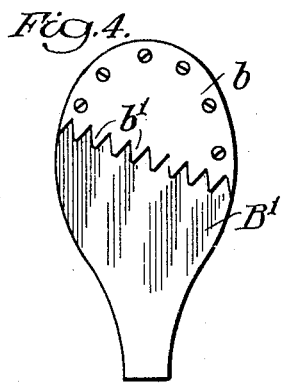
Figure 5:
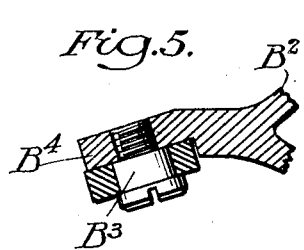
Fig. 5 is a detail transverse section taken on the line 5—5 of Fig. 1 and showing the forwardly inclined axis of the secondary core section at the right.

In order to maintain the key section A in perfect registration with the sections $B^1$ $B^2$ when the core is expanded, it is provided on its opposite ends with toothed plates $a$ which are adapted to interlock with corresponding plates $b$ secured to the upper ends of the secondary sections $B^1$ $B^2$. The secondary section $B^2$ is mounted to turn about a pivot stud $B^3$ screwed into a lug $B^4$ which, as shown best in Figs. 1 and 5, projects inwardly from the fixed section B and is disposed obliquely to the operative plane of the core. As a result of this arrangement, the free end of the section $B^2$ is allowed to clear the section $B^1$ when swung inwardly. The section $B^1$ is connected to a similar projection $B^5$ by means of a double pivot or swivel joint $B^6$ which permits it to be moved laterally as well as inwardly to clear the opposing sections $B^2$. A greater degree of collapsibility is thus afforded and the dismounting of the tire accomplished with little or no distortion. So far as described, the parts are or may be the same as those embodied in my prior Patent No. 1,323,165 and in themselves constitute no part of this invention.

Figure 2:
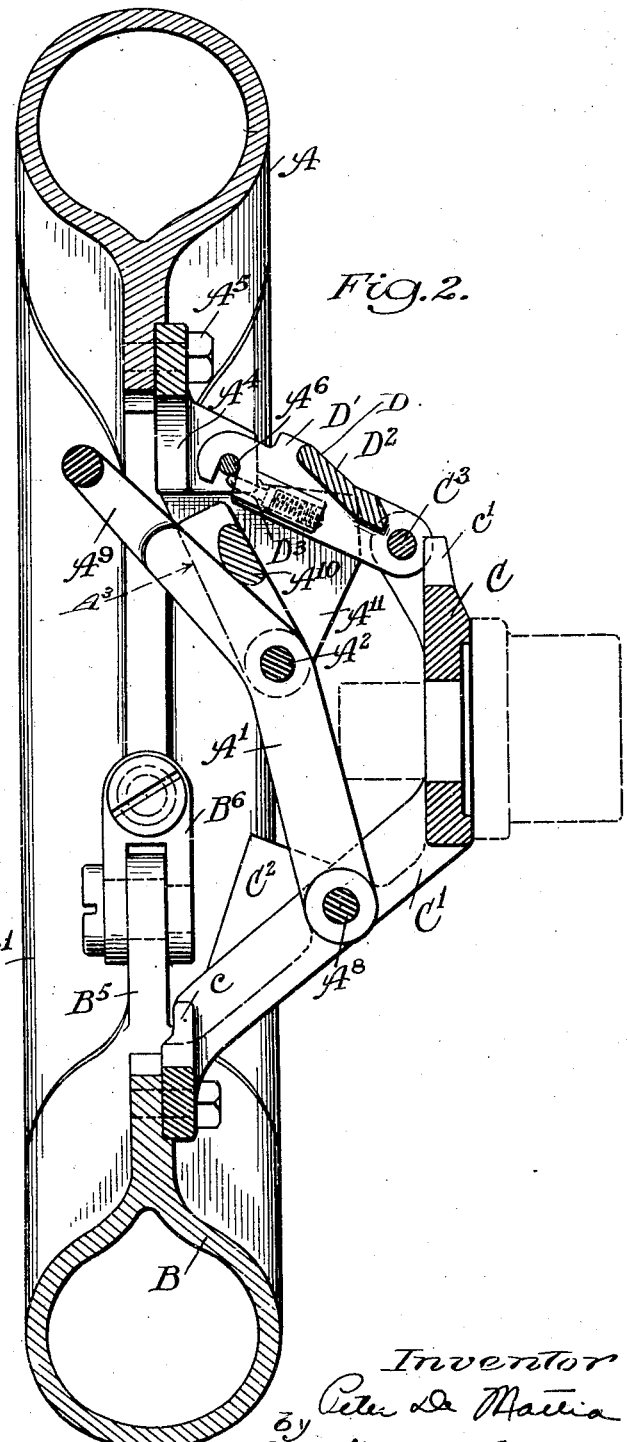
Fig. 2 is a vertical transverse section taken on the line 2—2 of Fig. 1.

According to the present invention, it is proposed to mount the key section so that it will be capable of a compound movement: first, inwardly substantially in the operative plane of the core that it may be removed more easily from the tire, and then forwardly out of the core plane in order to locate it in a position out of the way of the remaining core sections. To this end, see Figs. 1, 2, and 6, the key section A is supported by means of a toggle system including a link or actuating member $A^1$ hinged about midway of its length to a cross rod $A^2$ which is supported at its opposite ends in depending arms $A^3$ of a yoke member $A^4$, the latter being rigidly secured by screw bolts $A^5$ or the like to the key section A and provided with a second cross rod $A^6$ mounted in lugs $A^7$ projecting rearwardly therefrom, the purpose of which will presently appear. At its lower end, the link $A^1$ is mounted to turn on a rod or shaft $A^8$ which is located below the axis of rotation of the core, being supported in the present instance in the inclined side arms of a fixed bracket member $C^1$ forming part of the rotary support C. At its upper end, the link $A^1$ is provided with an operating handle $A^9$ whereby the link may be rocked to and fro about its pivotal axis $A^8$. With this arrangement, the key section may be drawn inwardly from the position of of operative continuity by pulling the handle $A^9$ forwardly but, as will be noted, it is caused to move in a plane disposed obliquely to the operative plane of the core. In accommodating the key section to such angular movement, it will be observed (Fig. 7) that the teeth $a^1$, $b^1$ of the interlocking plates $a$, $b$, before referred to, are disposed at a corresponding angle or obliquely to permit free movement of the key section into and out of its operative position. Moreover, the arrangement is such that the key section is not only sustained in its operative position by the link $A^1$ but will be locked therein as the toggle joint $A^2$ passes dead center; the handle $A^9$ at the same moment being arrested by its engagement with a cross bar $A^{10}$ with which the yoke member $A^4$ is provided (see Fig. 2).

In the withdrawal of the key section inwardly by the link $A^1$ as described, the key section will be turned to an oblique position in the first part of the forward and downward swinging movement of the link, and in such position and on the continued movement of the link, the section will be drawn inwardly between the ends of the adjacent side sections until it assumes the position shown in full lines in Fig. 6. As the link is moved further downwardly, the key section will move downwardly with it, and at the moment when the link reaches the limit of its downward movement and is arrested by the banking lugs $c$ in the bracket member $C^1$, as shown by the dotted lines in Fig. 6, by which time the key section will have been fully withdrawn from the tire, lugs $A^{11}$ projecting rearwardly from the depending arms $A^3$ of the yoke $A^4$ will engage with lugs $C^2$ projecting forwardly from the opposite sides of the inclined bracket members $C^1$ of the rotary support, and by such engagement the yoke will be supported and prevented from swinging to the rear, this position of the yoke being shown by dotted lines at the top in Fig. 6. From this position the key section can be swung downwardly on the cross bar $A^2$ as an axis, to its final horizontal position as shown by the dotted lines at the bottom in Fig. 6 and by the full lines in Fig. 8, wholly out of the plane of the other sections, so that the sections at the side can be swung inwardly to complete the collapsing of the core. The location of the pivotal axis $A^8$ of the link $A^1$ below and distant from the axis of the rotary support C, and adjacent the fixed bottom section B insures such a positioning of the key section when it is finally swung downwardly as described, that the secondary sections at the side may be freely swung inwardly to their final folded positions without any danger of being obstructed by the key section.

Means are further provided for restraining the key section A and the two secondary sections $B^1$ $B^2$ collectively against lateral displacement in relation to the fixed core section B when said sections occupy their respective positions of operative continuity, it being understood that the pivotal mounting of the movable core sections is not depended upon to afford the desired rigidity to the core proper during the tire building process. Such means, as best shown in Figs. 6 and 8, consist of a latch D which is pivotally mounted on a bearing rod $C^3$ carried in the upper end of the rotary support C, and formed with two side members $D^1$ (Fig. 8) connected by a web or cross bar $D^2$ to give the latch the required strength. This latch is swingable back and forth about the rod $C^3$ and is arranged to engage the cross rod $A^6$ hereinbefore mentioned. A detent $D^3$, mounted in the latch and adapted to engage the rod $C^3$ when the former is in its active position (see Fig. 1), is intended to prevent the latch from being accidentally forced out of its engagement with said rod while the core is rotating.

In dismounting a tire, according to the foregoing arrangement, the latch D is first forcibly disengaged from the cross rod $A^6$ and thrown back out of the way with the web $D^2$ resting on a suitable projection $c^1$ rising from the head of the rotary support C. The handle $A^9$ is then pulled forwardly, its initial movement serving to "break" the toggle system and thereby unlock the key section A and disengage the interlocking plates $a$, $b$ at the angle indicated. Continued movement of the handle about the axis $A^8$ causes the key section to be drawn further inwardly and, as the latter leaves the tire, the lugs $A^{11}$ are brought into engagement with the corresponding lugs $C^2$ and the yoke prevented from swinging to the rear, so that the key section may be swung down to its final dotted line position indicated in Fig. 6. The two secondary sections $B^1$ $B^2$ may now, in turn, be withdrawn from the tire by rocking them about their respective axes to their collapsed positions indicated by the broken lines in Fig. 8. The tire may now be quickly and easily dismounted since it is only supported by the fixed core section B. In restoring the core to its original annular form, the secondary core sections $B^1$ $B^2$ are first swung outwardly to their respective positions of continuity, and the key section A is then rocked upwardly and rearwardly until the lugs $A^{11}$ come in contact with the lugs $C^2$. The key section is thus supported temporarily in a position where it is out of the way of the link $A^1$ and its handle $A^9$, and from this position it may be raised by the link into locking engagement with the side sections $B^1$ $B^2$. As the link is pushed home with the handle against the cross bar $A^{10}$, the toggle system is forced past dead center and the three movable core sections A, $B^1$, $B^2$ are thus maintained in their interlocking annular relation. The latch D is finally swung into engagement with the rod $A^6$ to hold said sections rigidly in the operative plane of the core.

It will now be clear that three distinct advantages are presented by the use of the toggle system as above described: first, it permits the shifting of the key section out of the core plane at and by a single operation; second, it enables the key section to be moved in two directions which is very desirable since the first movement, being inwardly, allows it to be removed from the tire without distortion; and third, the locking of the key section in its position of operative continuity is accomplished automatically as the joint $A^2$ of the toggle system passes dead center and the handle $A^9$ banks against the cross bar $A^{10}$. These and other advantages will be readily appreciated by those skilled in the art.

Referring to Figs. 9 and 10, showing a modified form of the invention, the actuating member or link $A^{1x}$ is pivoted at its lower end on a horizontal rod or shaft $A^{8x}$ located below and distant from the axis of rotation of the rotary support, $C^x$, which rod is supported in the inclined arm $C^{1x}$ of the rotary support. At its upper end the link carries a cross rod $A^{2x}$ to which is pivoted the lower ends of arms $A^{3x}$ depending from a yoke member $A^{4x}$ fixed to the key section $A^x$ as by the fastening bolts $A^{5x}$, the arrangement being such that when the link is swung rearwardly on the rod $A^{8x}$ as an axis, to the dotted line position shown in Fig. 9 in order to collapse the core, the key section will be turned to an oblique position toward the rear and withdrawn inwardly from between the adjacent ends of the secondary side sections, from which position the key section can be swung forwardly and downwardly on the cross bar $A^{2x}$ as an axis to its final horizontal position indicated by the dotted lines so as to permit of the folding in of the side sections as in the first instance described. The link $A^{1x}$ and the yoke $A^{4x}$ with its depending arms $A^{3x}$ constitute, as in the first instance described a toggle system, which, when the link is swung upwardly and forwardly from the dotted line position to the full line position in Fig. 9 will, after the key section has been swung upwardly to the dotted line position, thrust the key section upwardly between the secondary side sections to the operative position of continuity. In this action, the joint $A^{2x}$ of the toggle system will pass dead center and be held, so as to lock the parts in their operative position of continuity, by banking lugs $A^{10x}$ fixed to the inclined arms of the rotary support in position to be engaged by the lower ends of the depending arms $A^{3x}$ when the joint of the toggle system passes center. Also as in the first instance described, a latch $D^x$ is employed to restrain the key section and secondary sections against lateral displacement, which latch is pivotally mounted on a bearing rod $C^{3x}$ sustained by the rotary support and is adapted to engage over a cross rod $A^{6x}$ carried by the yoke $A^{4x}$.

The link $A^{1x}$ is operated in this form of the invention, to draw the key section inwardly in collapsing the core and in positioning the key section in operative continuity to the other sections, by means of a portable handle or rod $A^{9x}$ which is adapted to be removably inserted in a socket $A^{12}$ in the link $A^{1x}$.

Having thus described my invention, what I claim is:

1. A collapsible core comprising a key section and a plurality of secondary sections adapted to be sustained in a position of operative continuity, said key section being movable inwardly and also to a position outside of the plane of the core, a rotatable support for said core, and an actuating member pivotally sustained by the rotatable support and pivotally connected to the key section, the latter being free when drawn inwardly by the movement of the actuating member to swing about its pivotal connection therewith to a position outside of the core plane.

2. A collapsible core comprising a key section and a plurality of secondary sections adapted to be sustained in a position of operative continuity, said key section being movable inwardly and also to a position outside of the plane of the core, a rotatable support for the core, and an actuating link pivoted at one end to the rotatable support and extending inwardly therefrom and pivotally conected to the key section, the latter being free when drawn inwardly by the movement of the actuating member to swing about its pivotal connection therewith to a position outside of the core plane.

3. A collapsible core comprising a key section and a plurality of secondary sections adapted to be sustained in a position of operative continuity, said key section being movable inwardly and also to a position outside of the plane of the core, a rotatable support for said core, and an actuating member pivoted to the rotatable support and to the key section on parallel axes, said key section bein free when drawn inwardly by the movement of the actuating member to be swung about its pivotal connection therewith to a position outside of the core plane.

4. A collapsible core comprising a key section and a plurality of secondary sections adapted to be sustained in a position of operative continuity, said key section being movable inwardly and also to a position outside of the plane of the core, a rotatable support for said core, and an actuating member pivoted to the rotatable support and to the key section on parallel axes disposed parallel to the plane of the core, said key section being free when drawn inwardly by the movement of the actuating member to be swung about its pivotal connection therewith to a position outside of the core plane.

5. A collapsible core comprising a key section and a plurality of secondary sections adapted to be sustained in a position of operative continuity, said key section being movable inwardly and also to a position outside of the plane of the core, and an actuating member pivotally sustained by the rotatable support on an axis located to one side of the axis of rotation of the core, and pivotally connected to the key section, the latter being free when drawn inwardly by the movement of the actuating member to swing about its pivotal connection therewith to a position outside of the core plane.

6. A collapsible core comprising a key section, a bottom section, and side sections, said sections being adapted to be sustained in a position of operative continuity, said key section being movable inwardly and also to a position outside of the plane of the core, and the side sections being foldable inwardly, a rotatable support to which the bottom section is fixed, and an actuating member pivotally sustained by said rotatable support at a point distant from the axis of the core and adjacent said bottom section, and being pivotally connected also to the key section, the latter being free when drawn inwardly by the movement of the actuating member to swing about its pivotal connection therewith to a position outside of the core plane.

7. A collapsible core comprising a key section and a plurality of secondary sections adapted to be sustained in a position of operative continuity, said key section being movable inwardly and also to a position outside of the plane of the core, a yoke fixed rigidly to the key section and extending inwardly in a path oblique to the core plane when the latter is in operative position, a rotatable support for the core, and an actuating member pivotally sustained by the rotatable support and pivoted to the inner end of the yoke for drawing the key section inwardly and permitting its movement to a position outside of the plane of the core.

8. A collapsible core comprising a key section and a plurality of secondary sections adapted to be sustained in a position of operative continuity, said key section being movable inwardly and also to a position outside of the plane of the core, a rotatable support for said core, and an actuating member pivotally sustained by the rotatable support and pivotally connected to the key section for moving it inwardly in collapsing the core, said key section being free when drawn inwardly by the movement of the actuating member to swing about its pivotal connection therewith to a position outside of the core plane, and the said key section and rotatable support being provided with surfaces adapted to engage with each other in the inward movement of the key section and by such engagement acting to give lateral temporary support to the key section.

9. A collapsible core comprising a key section and a plurality of secondary sections adapted to be sustained in a position of operative continuity, said key section being movable inwardly and also to a position outside of the plane of the core, a yoke fixed rigidly to the key section and extending inwardly when the latter is in operative position, a rotatable support for the core, an actuating member pivotally sustained by the rotatable support and pivoted to the inner end of the yoke for drawing the key section inwardly in a path oblique to the core plane and permitting its movement to a position outside of the plane of the core, lugs on the yoke, and lugs on the rotatable support in position to be engaged by the first mentioned lugs when the key section is moved inwardly and acting to give lateral temporary support to the same.

10. A collapsible core comprising an inwardly movable key section, and a plurality of secondary sections adapted to be sustained in a position of operative continuity, a rotatable support for said core, and an actuating member pivotally sustained by the rotatable support and pivotally connected to the key section to move the same inwardly in collapsing the core, and outwardly in positioning the key section in operative continuity with the other sections, said key section being free when drawn inwardly by the movement of the actuating member to swing about its pivotal connection therewith to a position outside of the core plane, and said pivotal connection of the actuating member with the key section being adapted, when the actuating member is operated to move the key section outwardly, to pass center and lock said section in operative position.

11. A collapsible core comprising an inwardly movable key section and a plurality of secondary sections adapted to be sustained in a position of operative continuity, a rotatable support for said core, an actuating member pivotally sustained by the rotatable support and pivotally connected to the key section for moving it inwardly in collapsing the core, and outwardly in positioning the key section in operative continuity with the other sections, said key section being free when drawn inwardly by the movement of the actuating member to swing about its pivotal connection therewith to a position outside of the core plane, and said pivotal connection of the actuating member with the key section being adapted, when the actuating member is operated to move the key section outwardly, to move past the dead center, and a stop in position to be engaged by said actuating member to limit said movement past dead center.

12. A collapsible core comprising a key section and a plurality of secondary sections adapted to be sustained in a position of operative continuity, a rotatable support for said core, and actuating means sustained by the rotatable support and operatively connected with the key section for moving the same between the ends of adjacent secondary sections, said actuating means being operable to cause the key section in such movement to pursue a path oblique to the plane of the core, and the adjacent ends of the key section and secondary sections being provided with interlocking members disposed obliquely across their meeting faces for maintaining said sections in annular registration.

In testimony whereof, I have affixed my signature hereto.

PETER DE MATTIA.